United States Patent
Agon et al.

(10) Patent No.: US 9,433,317 B2
(45) Date of Patent: Sep. 6, 2016

(54) CAPSULE STORAGE

(71) Applicant: Nestec S.A., Vevey (CH)

(72) Inventors: Fabien Ludovic Agon, Blonay (CH); Marco Magatti, Lausanne (CH); Minh Quan Phan, Bussigny (CH)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 14/426,461

(22) PCT Filed: Sep. 6, 2013

(86) PCT No.: PCT/EP2013/068415
§ 371 (c)(1),
(2) Date: Mar. 6, 2015

(87) PCT Pub. No.: WO2014/037473
PCT Pub. Date: Mar. 13, 2014

(65) Prior Publication Data
US 2015/0216352 A1 Aug. 6, 2015

(30) Foreign Application Priority Data
Sep. 7, 2012 (EP) .................................. 12183523

(51) Int. Cl.
| A47J 31/00 | (2006.01) |
| A47J 31/44 | (2006.01) |
| A47J 31/36 | (2006.01) |
| G06K 7/10  | (2006.01) |

(52) U.S. Cl.
CPC ......... *A47J 31/4492* (2013.01); *A47J 31/3642* (2013.01); *G06K 7/10366* (2013.01)

(58) Field of Classification Search
CPC .......................... A47J 31/4492; A47J 31/407
USPC ........................................... 340/10.1; 99/280
See application file for complete search history.

(56) References Cited

U.S. PATENT DOCUMENTS

| 2011/0250333 A1* | 10/2011 | Ozanne ................ A47J 31/002 |
|                   |         |                        426/435    |
| 2012/0295234 A1* | 11/2012 | Rognon ............. A47J 31/3623 |
|                   |         |                        434/127    |

FOREIGN PATENT DOCUMENTS

| DE | 20121494 U1 | 10/2002 |
| EP | 2106727 A1  | 10/2009 |

(Continued)

OTHER PUBLICATIONS

International Search Report, mailed Oct. 2, 2013, in PCT/EP2013/068415, filed Sep. 6, 2013.

(Continued)

*Primary Examiner* — Kevin Kim
(74) *Attorney, Agent, or Firm* — Dunlap Codding, P.C.

(57) ABSTRACT

The invention pertains to the field of the beverage preparation machines having an ingredient processing module for preparing a beverage with at least one ingredient supplied with a capsule, and their accessories. In particular, the invention relates to a device comprising a container for storing capsules comprising:
  a first interface for communicating with feedback means;
  a sensing arrangement for detecting and obtaining information on a capsule in a detection area;
  a controller configured to send, through the first interface, information related to the detected capsule, to the feedback means.

16 Claims, 4 Drawing Sheets

(56) References Cited

FOREIGN PATENT DOCUMENTS

| WO | 2008113459 A1 | 6/2008 |
| WO | 2009133570 A2 | 11/2009 |

OTHER PUBLICATIONS

Written Opinion of the International Search Report, mailed Oct. 2, 2013, in PCT/EP2013/038415, filed Sep. 6, 2013.

* cited by examiner

Fig. 7b ved and/or claimed inventive concept(s) relates to 20 accessories for storing capsules, and machines for preparing a beverage adapted to cooperate with such accessories.

CAPSULE STORAGE

CROSS REFERENCE TO RELATED APPLICATIONS/INCORPORATION BY REFERENCE STATEMENT

This application is a US national stage application filed under 35 USC §371 of International Application No. PCT/EP2013/068415, filed Sep. 6, 2013; which claims benefit of EP Application No. 12183523.5, filed Sep. 7, 2012. The entire contents of the above-referenced applications are hereby expressly incorporated herein by reference.

FIELD OF THE INVENTIVE CONCEPT(S)/BACKGROUND

The presently disclosed and/or claimed inventive concept(s) pertains to the field of the beverage preparation systems, in particular using capsules containing an ingredient for preparing a beverage. More particularly, the presently disclosed and/or claimed inventive concept(s) relates to accessories for storing capsules, and machines for preparing a beverage adapted to cooperate with such accessories.

For the purpose of the present description, a "beverage" is meant to include any human-consumable liquid substance, such as coffee, tea, hot or cold chocolate, milk, soup, baby food or the like. A "capsule" is meant to include any pre-portioned beverage ingredient or combination of ingredients (hereafter called "ingredient") within an enclosing packaging of any suitable material such as plastic, aluminium, a recyclable and/or biodegradable material and combinations thereof, including a soft pod or a rigid cartridge containing the ingredient.

Certain beverage preparation machines use capsules containing an ingredient to be extracted or to be dissolved and/or an ingredient that is stored and dosed automatically in the machine or else is added at the time of preparation of the drink. Some beverage machines possess liquid filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing a beverage ingredient is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Capsules storages are commonly used to store in a common place, outside the beverage machine, a stock of capsules. For instance, a user can conveniently put the capsules that he had just bought, in this accessory, generally placed at the immediate vicinity of his beverage preparation machine. For preparing his beverage, the user then might pick up an appropriate capsule in the capsules storage, and put it directly in the machine.

However, the existing capsule storages do not provide any further possibilities for providing information on the stored capsules, and interactions with the user are very limited. That's why there is still a need to increase convenience of such device, in particular by providing information on the capsules and new functionalities.

BRIEF DESCRIPTION OF THE DRAWINGS

The presently disclosed and/or claimed inventive concept(s) will now be described with reference to the schematic drawings, wherein:

DETAILED DESCRIPTION

A non-limiting object of the presently disclosed and/or claimed inventive concept(s) is to provide more convenience, and less user's intervention in the way of handling storage of capsules. Another non-limiting object is to provide additional information or feedback on stored capsules.

One or more of these non-limiting objects are met by devices and methods according to the independent claims. The dependent claims further provide solutions to these non-limiting objects and/or additional benefits.

More particularly, according to a first non-limiting aspect, the presently disclosed and/or claimed inventive concept(s) relates to a device comprising a container for storing capsules containing an ingredient for preparing a beverage using a beverage preparation machine. The device further comprises: (a) a first interface for communicating with feedback means; (b) a sensing arrangement adapted to detect the presence of a capsule in a detection area and to obtain information related to said capsule; and (c) a controller configured to send, through the first interface, information related to the detected capsule.

The device allows in particular gathering and sending data related to the detected capsule to feedback means for providing the user information on said capsule. This is particularly advantageous for beverage preparation systems having different types of capsules, as it allows, for example, the user identifying the type of a given capsule stored in the capsule storage, and optionally to access further information related to said capsule such a description or instructions to prepare a beverage. The presently disclosed and/or claimed inventive concept(s) allows also a user using a device he already owns, in cooperation to the inventive concept(s), to get access to advance functionalities/information while not increasing drastically the cost of the storage device.

In particular, the sensing arrangement may be adapted to obtain information related to the capsule by receiving or reading information from the capsule, for example by reading a magnetic code or memory of an RFID tag, and/or by measuring at least one of the following characteristic of the capsule: spectral property, colour, electrical property, resistivity, capacitance, electromagnetic property, magnetic induced field, mechanical property, geometry, weight, identifying information, code bar, emitted or reflected signal. The sensing arrangement may be further adapted to identify a type for the capsule, and send, through the first interface, data related to the type for the capsule, the controller being further configured to send, through the first interface, the type of the capsule in the detection area, to the feedback means. The device allows then the feedback means to display information on said capsule, for example the type of capsule, information on ingredients included in the capsule, recipes related to said capsule, a description, volume of beverage that can be prepared with said capsule, the intensity of the beverage that can be prepared with said capsule, etc.

The device may further comprise, in the detection area, a positioner arranged to hold at least one capsule.

The sensing arrangement may also be further adapted to count the number of capsules in the detection area; the controller being further configured to send, through the first interface, the number of capsules in the detection area, to the feedback means. For instance, the sensing arrangement may be adapted to count the number of capsules in the detection area by receiving or reading information from the capsules present in the detection area, for example by receiving signals from RFID tags embedded in each capsule and identifying each one separately, and/or by measuring at least one of the following characteristic of the capsules positioned in the detection area: geometry or optical pattern recognition, weight, identifying information for identifying each capsules separately. The user can have a feedback of the content of his container in an efficient way and know at any time what the number of capsules in his stock.

The device may further comprise a feedback arrangement coupled to the first interface and arranged to provide information to the user related to the information received on the first interface. The feedback arrangement may in particular be embed in the device and integrated with it. The device may further comprise a visual feedback arrangement, for instance a display and/or a screen and/or light emitting arrangements, coupled to the first interface and arranged to provide information to the user related to the information received on the first interface. The user can have a visual feedback of the content of his container in an efficient and attractive way.

In an embodiment, the first interface is further adapted to communicate with an external device provided with feedback and/or display means. For instance the external device may be a Smartphone, a tablet, or a computer. The device may further comprise a docking station provided with a support for holding an external device. Said docking station may be provided with connectors for supplying energy to an external device held by the support. The device may further comprise a second connector adapted to be coupled to a third external connector of a beverage preparation machine, the second connector being arranged to receive energy supplied by the third external connector and to distribute through a power circuit said energy to components of the device. Adding such functionalities to a capsule storage in a common device avoid the duplication devices having the same purpose in the vicinity of the beverage preparation system, reducing cost and providing convenience to the user.

The device may further comprise a second interface adapted for exchanging data with a beverage preparation machine. The controller may be further configured to send, through the second interface, the information related to the detected capsule, to the beverage preparation machine. The controller may be further configured to send, through the first interface, the information received from the beverage preparation machine on the second interface. It allows the user to expand if required or desired the storage capacities of the beverage preparation machine by using the extra capabilities of the capsule storage. The cost of the beverage preparation machine can consequently be reduced. Reciprocally using information provided by the beverage preparation machine allows keeping the capsule storage more simple. More generally, it makes the systems, comprising the beverage machine and the capsule storage, more flexible, adaptable, and customizable.

The first interface and/or the second interface may be in particular a wireless interface, adapted for communicating with feedback means without direct mechanical connection, such as a Bluetooth and/or WIFI and/or Near Field Communication interface(s). The communication interface may be in particular a wireless interface, adapted for communicating with feedback means without direct mechanical connection, such as a Bluetooth and/or WIFI and/or Near Field Communication interface(s).

According to a second non-limiting aspect, the presently disclosed and/or claimed inventive concept(s) relates to a system comprising a device according to the first non-limiting aspect and at least one capsule wherein the capsule is arranged to communicate information to the sensing arrangement to detect its presence in the detection area, and/or least one of the following measurable characteristics of the capsule: spectral property, colour, electrical property, resistivity, capacitance, electromagnetic property, magnetic induced field, mechanical property, geometry, weight, identifying information, code bar, emitted or reflected signal; said information and/or measurable characteristic(s) being further selected to provide or refer to information related to the detected capsule to the controller through the first interface.

According to a third non-limiting aspect, the presently disclosed and/or claimed inventive concept(s) relates the use of a capsule with a device according to the first non-limiting aspect, said capsule being arranged to communicate information to the sensing arrangement to detect its presence in the detection area, and/or least one of the following measurable characteristics of the capsule: spectral property, colour, electrical property, resistivity, capacitance, electromagnetic property, magnetic induced field, mechanical property, geometry, weight, identifying information, code bar, emitted or reflected signal; said information and/or measurable characteristic(s) being further selected to provide or refer to information related to the detected capsule to the controller through the first interface.

According to a fourth non-limiting aspect, the presently disclosed and/or claimed inventive concept(s) relates to a beverage preparation machine comprising: (a) a communication interface adapted for exchanging data with a device according to the first non-limiting aspect; and/or (b) a connector adapted to be coupled to an external connector of a device according to the first non-limiting aspect for supplying energy to said device.

According to a fifth non-limiting aspect the presently disclosed and/or claimed inventive concept(s) relates to a method for displaying information related to a capsule. In a first optional step, an external feedback means, such as a Smartphone, is coupled to the communication interface of a device according to the first non-limiting aspect, for example by plugging said device to a docking station or by coupling wirelessly said device with the communication interface. Optionally, the launch or the activation or the display of the user-interface of a dedicated software may be triggered automatically or manually, during the first step. In a second step, upon insertion and/or detection of the presence of a capsule in the detection area of the device according to the first non-limiting aspect, the sensing arrangement of the device according to the first non-limiting aspect is configured to detect the type of said capsule. For instance, during the second step, the sensing arrangement is used to watch over the detection area, so as to detect the presence of a capsule. The sensing arrangement may be operated continuously. Alternatively, the sensing arrangement may be used during discrete time periods: for example sensing arrangement may be activated every second during the time needed to detect an eventual presence of a capsule onto the detection area. The second step is carried out repeatedly, until a capsule is actually detected. During the second step, the sensing arrangement is used to measure a set of characteristics of the detected capsule. A profile $Pr_C$ of the detected capsule can then be drawn up from the measured characteristics. The profile $Pr_C$ comprises at least one minimal set of information necessary to identify the belonging of the detected capsule to a reference group. A corresponding reference profile $Pr_{REF}$ is defined for each reference group, defining a set of reference profiles $Pr_{REF}[\ ]$. The reference groups are used to divide capsules into different sets. Each reference profile $Pr_{REF}$ comprises at least a minimal set of characteristics that a capsule should reproduce to be identified as belonging to at least one corresponding reference group. Each reference profile $Pr_{REF}$ may comprise, for at least each characteristic of the minimal set, a target value, a range, and/or a list of acceptable target values that a capsule should reproduce to be identified as belonging to the corresponding reference group. During the second step, the sensing arrangement compares the profile $Pr_C$ of the detected capsule with the reference profiles $Pr_{REF}[\ ]$. The reference profiles $Pr_{REF}[\ ]$ may be stored permanently or temporarily within the memories of the sensing arrangement. The reference profiles $Pr_{REF}[\ ]$ may be entered on the machine at a setup step or being downloaded on demand. The reference profiles $Pr_{REF}[\ ]$ may be obtained from a remote location or from a removable memory device, like an USB key or from a portable digital device, connected temporarily to the machine. The reference profiles $Pr_{REF}[\ ]$ may be updated or parameterized, for example, to take into consideration particular characteristics of the machine, such as calibration data or actual characterization performances of the recognition unit. In particular, it is determined whether the capsule's profile $Pr_C$ matches one of the reference profiles $Pr_{REF}[\ ]$. If the profile $Pr_C$ of the capsule does not match any reference profiles $Pr_{REF}[\ ]$, information I1_UNIDENTIFIED is generated by the sensing arrangement. By contrast, if the profile $Pr_C$ of the capsule matches one of the reference profiles the reference profiles $Pr_{REF}[\ ]$, information I1_IDENTIFIED is generated by the controller 10. The information I1_IDENTIFIED includes at least information to identify the corresponding reference profile, for example a unique identifier corresponding to a given reference profile $Pr_{REF}$. Several criteria may be applied to determine if a profile matches one of the reference profiles. For example, a given capsule may belong to one of four groups: aluminium capsules, capsules adapted to prepare a short espresso (ristretto, 25 ml), capsules adapted to prepare an espresso (40 ml), capsules adapted to prepare a long espresso (lungo, 110 ml). The reference profile $Pr_{REF}$ corresponding to the aluminium capsules contains for example a resistivity range centered around 100 ohms more or less 10%. The reference profile $Pr_{REF}$ corresponding to the short espresso group may contain a color range covering green tones (between 520 and 570 nm, for example). In this last example, the profile of a capsule having a light green outside membrane and a measured resistivity of 97 ohms would match the reference profile of the short espresso group and those of the aluminium capsules group. Consequently, the capsule would be considered as belonging to the short espresso group and to the aluminium capsules group. A capsule having a red outside membrane would not be considered as a member of the short espresso group. In an embodiment, a reference profile may also comprise a plurality of minimal sets of information necessary to identify the belonging of the detected capsule to one reference group. In particular, a reference profile may comprise, for at least one characteristic of the minimal set, a plurality of target value, and/or range, and/or list of acceptable target values, that a capsule should reproduce to be identified as belonging to the corresponding reference group. For example, the reference profile $Pr_{REF}$ corresponding to the short espresso group may contain a plurality of color ranges covering green tones (between 520 nm and 570 nm, for example) and red tones (between 630 nm and 740 nm, for example). In this last example, the profile of a capsule having a light green outside membrane would match the reference profile of the short espresso group. The profile of a capsule having a red outside membrane would also match the reference profile of the short espresso group. In another example, the reference profile $Pr_{REF}$ corresponding to the aluminium capsule may contain a plurality of couples of target resistance and capacitance values. Other approach may be applied to determine if a profile matches one of the reference profiles, for example using Bayesian networks, self-learning neural networks, and, generally speaking, probabilistic methods. In an alternative embodiment, the dedicated software running on the external feedback means, such as an application running on a Smartphone, may be used to perform the necessary steps, or part of said steps, for determining the type of the detected capsule, based upon information provided by the sensing arrangement and transmitted by the controller on the communication interface. In a third step, information related to the detected capsule, like its type, provided by the sensing arrangement, is transmitted by the controller of the device according to the first non-limiting aspect on the communication interface of the device according to the first non-limiting aspect. Optionally, the feedback means may display said information or used said information to display information related to the detected capsule by processing information received on the communication interface and/or retrieving locally or remotely data related to the received information.

Figure 1:
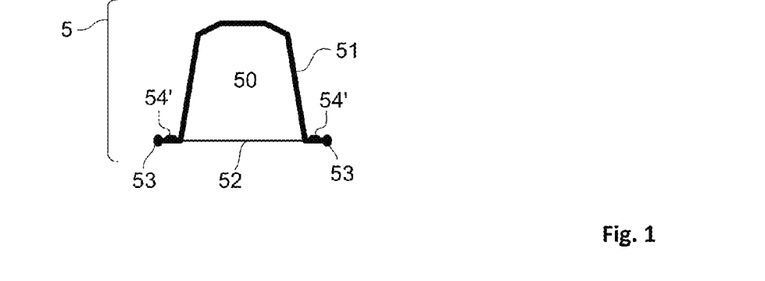
FIG. 1 is a cross section of a capsule adapted to be used by the beverage machine to prepare a beverage.
Figure 7A:
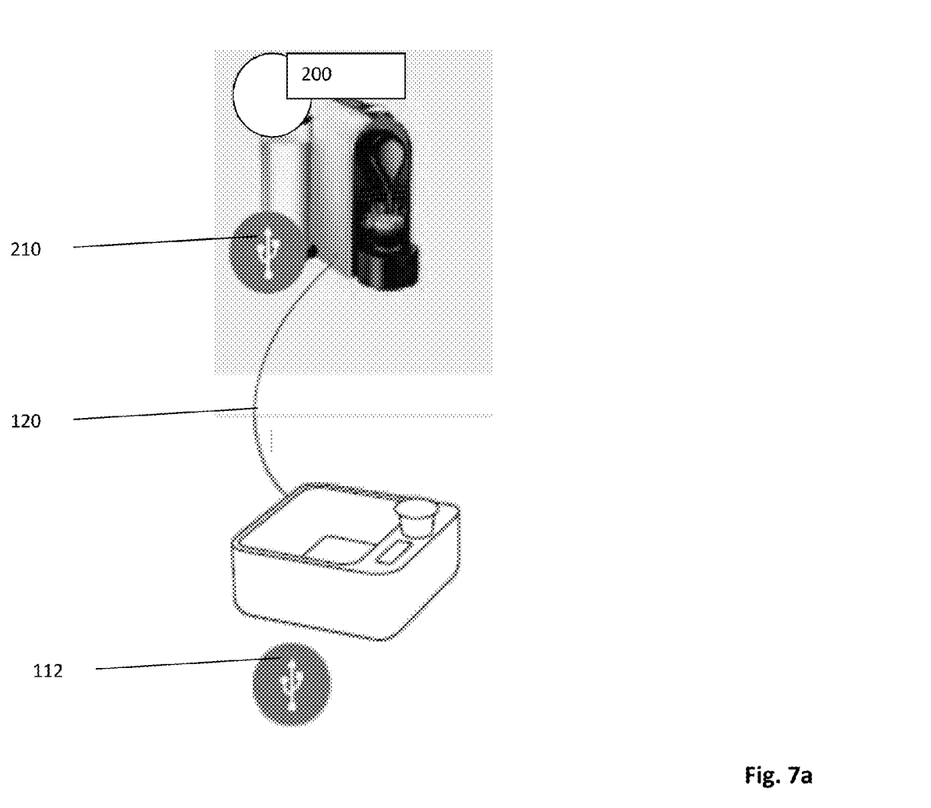
FIG. 7a, 7b are perspective representations of a systems comprising a beverage preparation machine according to an embodiment and a capsule storage according to an embodiment.
Figure 7B:
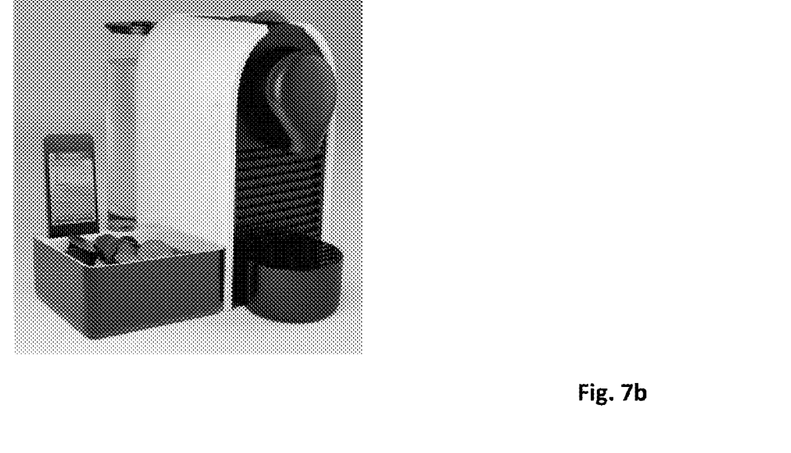

A beverage machine 200 according to an embodiment is illustrated schematically on FIGS. 7a and 7b. The beverage machine comprises typically a brewing unit which is coupled with an electrical motor driving transmission means for moving the brewing unit between an opened and a closed position. The brewing unit allows the preparation of a beverage from a capsule 5, as represented on FIG. 1, containing at least one ingredient, e.g. ground coffee or tea or chocolate. As shown in FIG. 1, the capsule has a generally cup-shaped body 51 and a lid such as a covering membrane 52. Membrane is assembled to cup along a peripheral rim 54 of cup. The rim may comprise a seal 54', e.g. made of elastomeric or plastic material, for improving the fluid-tight engagement of the capsule in the brewing unit. Furthermore, the capsule in particular the rim and/or the membrane may bear a ring or toroid 53, e.g. for assisting manufacturing and/or handling of the capsule. Such capsule forms a packaging for containing an ingredient 50, e.g. ground coffee, of a beverage to be prepared with the beverage preparation machine. In an embodiment, the capsule forms a gastight packaging, e.g. made of aluminium or an aluminium-alloy. Alternatively, the capsule may be more or less pervious, e.g. perforated and/or made of organic, in particular plastic material, e.g. biodegradable material. The capsule's cup and/or the capsule's lid may be made of a monolithic material, e.g. a metallic material or a conductive ceramic and/or conducive organic material, or may be made of a structure covered or containing a conductive material, e.g. a conductive coating or track, e.g. an aluminium, iron and/or copper coating or track.

Figure 2:
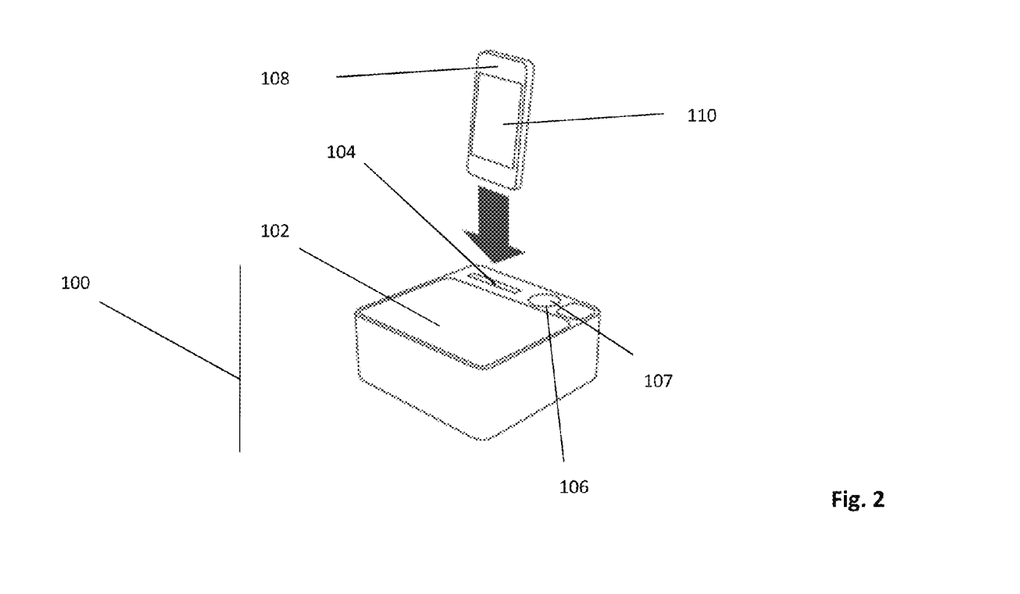
FIG. 2 is a perspective representation of a capsule storage according to an embodiment and a Smartphone.
Figure 3:
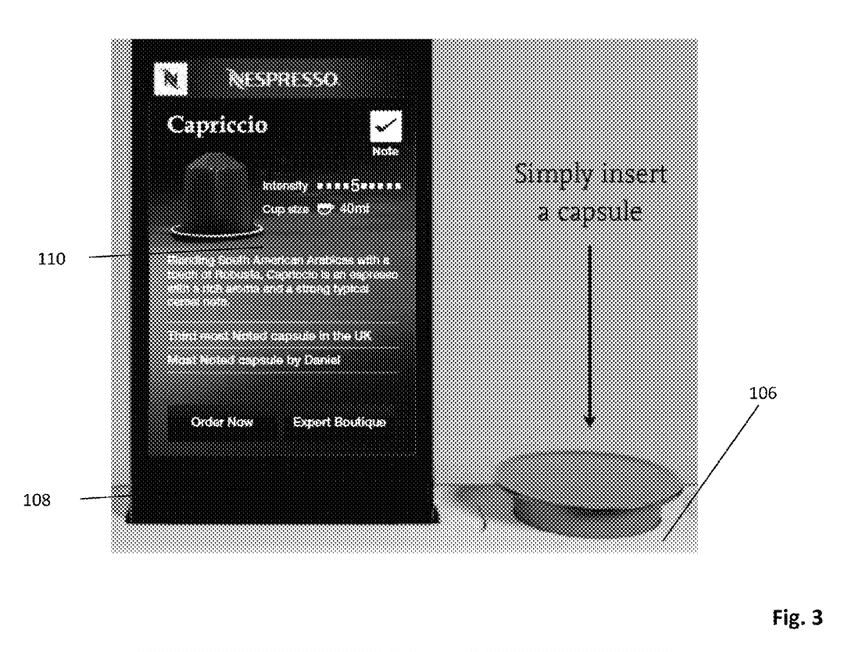
FIG. 3 shows a screenshot of displayed feedback information related to a detected capsule positioned in the detection area of the capsule storage.
Figure 4:
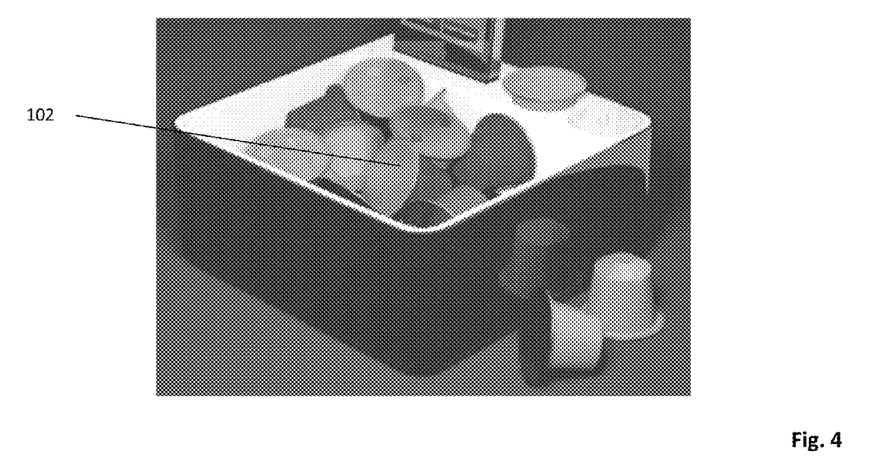
FIG. 4 is a perspective representation of a capsule storage with a container filled with capsule.

Referring to FIG. 2, there is shown therein a capsule storage 100 comprising a container 102. The container 102 is adapted to hold a plurality of capsules 5, as represented on FIG. 4. For instance, the container 102 may be a cavity formed in a housing of the capsule storage 100. The container can be filled in with capsules 5 by the user for easily pick-up one of the capsules 5 held by the container when he want to prepare a beverage. The capsule storage 100 comprises a sensing arrangement 106 adapted to detect the presence of a capsule in a detection area and to obtain information related to said capsule.

In the embodiment illustrated on FIGS. 2, 3, 4, 5, the sensing arrangement 106 comprises, in the detection area, a capsule positioner having a seat 107 adapted to store at least one first capsule. The capsule seat is formed in a housing of the capsule storage 100. Alternatively, the capsule seat may be a separate part mounted on the housing of the capsule storage (not represented on the drawings). The capsule seat may comprise guides formed into the housing and surrounding the capsule seat, in particular to ease the positioning of a capsule by a user and/or to improve the holding of a capsule in the seat. The sensing arrangement 106 may also be further adapted to determine a type for a detected capsule positioned onto the capsule positioner or in the detection area. The detection of a capsule and the recognition of its type can be obtain by receiving or reading information from a capsule, for example identification data emitted by a radiofrequency component embedded in the detected capsule. It can also be realized by measuring at least one characteristic of the capsule, for example: spectral property, electrical property, electromagnetic property, emitted or reflected signal, color, resistivity, capacitance, variation of the magnetic field, magnetic induced field, geometry, code bar, identifier, signal, electromagnetic echo, weight, and mechanical parameter. Some characteristics may be obtained passively by a sensor without interacting with the detected capsule. For instance, it is possible to recognize an outside color of a part of the capsule. Other characteristics may be obtained actively by the sensor in interacting with the detected capsule. For example the sensor may apply an alternative current to the detected capsule and then may measure parameters of the inductive field generated this way and/or resistivity and/or capacitance of the detected capsule.

In the perspective views of FIGS. 2, 3, 4, 5, the detection means and recognition means are not visible, hidden by the housings of the capsule storage: The capsule detector and the recognition means may be positioned in the vicinity of the detection area, for instance near the capsule positioner, and more particularly, near, around and/or in the capsule seat.

The capsule storage comprises a communication interface 104 for communicating with feedback means. In the embodiment illustrated on FIGS. 2, 3, 4, 5, the capsule storage comprises a docking station 105 provided with a support for holding an external device 108. In particular, the external device 108 may be a Smartphone provided with a display 110, as illustrated on FIGS. 2 and 3. The docking station 104 can be provided with connectors for supplying energy to an external device held by the support, for example for charging the battery of a Smartphone when the latter is coupled to the docking station. In another embodiment (not illustrated), the communication interface 104 is a wireless interface, adapted for communicating with feedback means without direct mechanical connection, such as a Bluetooth and/or WIFI and/or Near Field Communication interface(s).

The capsule storage comprises a controller configured to send, through the communication interface 104, information related to the detected capsule, to the feedback means. More particularly, the information may comprise the type for the detected capsule positioned onto the capsule positioner or in the detection area. The type for the detected capsule is determined using information provided by the sensing arrangement, or information allowing the feedback element to determine a type for the detected capsule, such as its spectral property, electrical property, electromagnetic property, emitted or reflected signal, color, resistivity, capacitance, variation of the magnetic field, magnetic induced field, geometry, code bar, identifier, signal, electromagnetic echo, weight, and mechanical parameter. As illustrated on the FIG. 3, the Smartphone having received this information through the communication interface 104 can present it on its display. More particularly, the Smartphone may display on its screen for the detected capsule in the detection area: the type of the Capsule (e.g. "Capriccio", the intensity of the beverage obtained using said capsule, the volume of beverage that is recommended to prepare with said capsule, a description of the ingredients contained in said capsule, information retrieved remotely related to said capsule (for example popularity of the capsule amongst customers, member of a club or social network on Internet), user-specific information retrieved in the Smartphone or remotely related to said capsule (for example a note/memo, written by the owner of the Smartphone for said given type of the detected capsule), etc. The information or part of the information displayed on the Smartphone may be retrieved remotely, for instance on Internet, on a local network or from a remote storage, using information related to the capsule received from the communication interface. The information or part of the information displayed on the Smartphone may be retrieved locally using information related to the capsule received from the communication interface.

Figure 5:
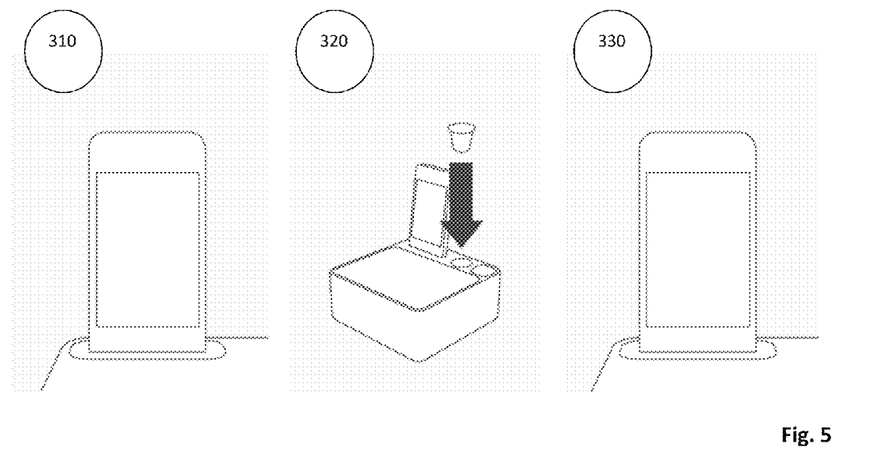
FIG. 5 is a synoptic of a method for displaying information related to a capsule according to an embodiment.

Referring now to FIG. 5, there is shown therein the steps of a method for displaying information related to a capsule according to an embodiment. In a first optional step 310, an external feedback means, such as a Smartphone, is coupled to the communication interface 104, for example by plugging said device to a docking station or by coupling wirelessly said device with the communication interface. Optionally, the launch or the activation or the display of the user-interface of a dedicated software may be triggered automatically or manually, during the first step. In a second step 320, upon insertion and/or detection of the presence of a capsule in the detection area, the sensing arrangement is configured to detect the type of said capsule. For instance, during the second step 320, the sensing arrangement is used to watch over the detection area, so as to detect a presence of a capsule. The sensing arrangement may be operated continuously. Alternatively, the sensing arrangement may be used during discrete time periods: for example sensing arrangement may be activated every second during the time needed to detect an eventual presence of a capsule onto the detection area. The second step is carried out repeatedly, until a capsule is actually detected. During the second step 120, the sensing arrangement is used to measure a set of characteristics of the detected capsule. A profile $Pr_C$ of the detected capsule can then be drawn up from the measured characteristics. The profile $Pr_C$ comprises at least one minimal set of information necessary to identify the belonging of the detected capsule to a reference group. A corresponding reference profile $Pr_{REF}$ is defined for each reference group, defining a set of reference profiles $Pr_{REF}[\ ]$. The reference groups are used to divide capsules into different sets. Each reference profile $Pr_{REF}$ comprises at least a minimal set of characteristics that a capsule should reproduce to be identified as belonging to at least one corresponding reference group. Each reference profile $Pr_{REF}$ may comprise, for at least each characteristic of the minimal set, a target value, a range, and/or a list of acceptable target values that a capsule should reproduce to be identified as belonging to the corresponding reference group. During the second step, the sensing arrangement compares the profile $Pr_C$ of the detected capsule with the reference profiles $Pr_{REF}[\ ]$. The reference profiles $Pr_{REF}[\ ]$ may be stored permanently or temporarily within the memories of the sensing arrangement. The reference profiles $Pr_{REF}[\ ]$ may be entered on the machine at a setup step or being downloaded on demand. The reference profiles $Pr_{REF}[\ ]$ may be obtained from a remote location or from a removable memory device, like an USB key or from a portable digital device, connected temporarily to the machine. The reference profiles $Pr_{REF}[\ ]$ may be updated or parameterized, for example, to take into consideration particular characteristics of the machine, such as calibration data or actual characterization performances of the recognition unit. In particular, it is determined whether the capsule's profile $Pr_C$ matches one of the reference profiles $Pr_{REF}[\ ]$. If the profile $Pr_C$ of the capsule does not match any reference profiles $Pr_{REF}[\ ]$, information I1_UNIDENTIFIED is generated by the sensing arrangement. By contrast, if the profile $Pr_C$ of the capsule matches one of the reference profiles the reference profiles $Pr_{REF}[\ ]$, information I1_IDENTIFIED is generated by the controller 10. The information I1_IDENTIFIED includes at least information to identify the corresponding reference profile, for example a unique identifier corresponding to a given reference profile $Pr_{REF}$. Several criteria may be applied to determine if a profile matches one of the reference profiles. For example, a given capsule may belong to one of four groups: aluminium capsules, capsules adapted to prepare a short espresso (ristretto, 25 ml), capsules adapted to prepare an espresso (40 ml), capsules adapted to prepare a long espresso (lungo, 110 ml). The reference profile $Pr_{REF}$ corresponding to the aluminium capsules contains for example a resistivity range centered around 100 ohms more or less 10%. The reference profile $Pr_{REF}$ corresponding to the short espresso group may contain a color range covering green tones (between 520 and 570 nm, for example). In this last example, the profile of a capsule having a light green outside membrane and a measured resistivity of 97 ohms would match the reference profile of the short espresso group and those of the aluminium capsules group. Consequently, the capsule would be considered as belonging to the short espresso group and to the aluminium capsules group. A capsule having a red outside membrane would not be considered as a member of the short espresso group. In an embodiment, a reference profile may also comprise a plurality of minimal sets of information necessary to identify the belonging of the detected capsule to one reference group. In particular, a reference profile may comprise, for at least one characteristic of the minimal set, a plurality of target value, and/or range, and/or list of acceptable target values, that a capsule should reproduce to be identified as belonging to the corresponding reference group. For example, the reference profile $Pr_{REF}$ corresponding to the short espresso group may contain a plurality of color ranges covering green tones (between 520 nm and 570 nm, for example) and red tones (between 630 nm and 740 nm, for example). In this last example, the profile of a capsule having a light green outside membrane would match the reference profile of the short espresso group. The profile of a capsule having a red outside membrane would also match the reference profile of the short espresso group. In another example, the reference profile $Pr_{REF}$ corresponding to the aluminium capsule may contain a plurality of couples of target resistance and capacitance values. A profile of a capsule will match a reference profile of the aluminium capsule if:

the capsule has a resistance of 100 ohms+/−5% and a capacitance of 100 nF+/−2%; or, the capsule has a resistance of 1000 ohms+/−5% and a capacitance of 50 nF+/−2%.

In this last example, the profile of a capsule having a resistance of 101 ohms and a capacitance of 50 nF will not be considered to belong to the aluminium capsules group. Other approach may be applied to determine if a profile matches one of the reference profiles, for example using Bayesian networks, self-learning neural networks, and, generally speaking, probabilistic methods. In an alternative embodiment, the dedicated software running on the external feedback means, such as an application running on a Smartphone, may be used to perform the necessary steps, or part of said steps, for determining the type of the detected capsule, based upon information provided by the sensing arrangement and transmitted by the controller on the communication interface.

In a third step 330, information related to the detected capsule, like its type, provided by the sensing arrangement, is transmitted by the controller on the communication interface. Optionally, the feedback means may display said information or used said information to display information related to the detected capsule by processing information received on the communication interface and/or retrieving locally or remotely data related to the received information. An example of information that can be displayer are shown on FIG. 3.

Figure 6:
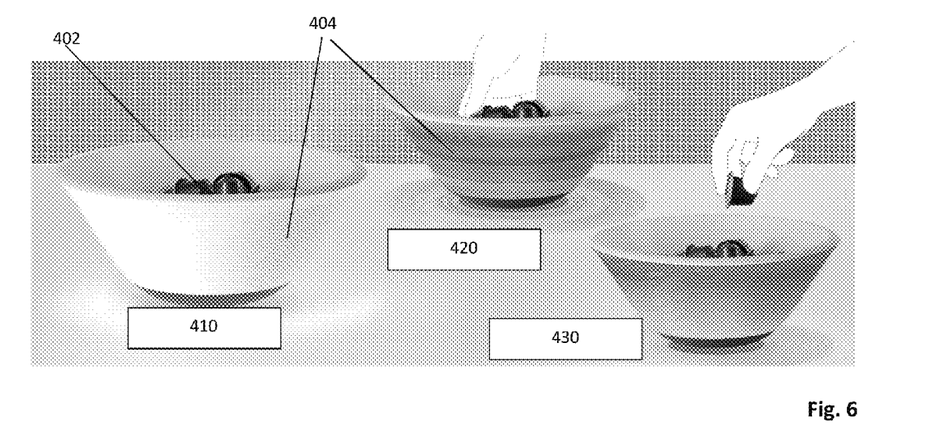
FIG. 6 is a perspective representation of a capsule storage according to an embodiment.

Referring to FIG. 6, there is shown therein an embodiment of a capsule storage 400 comprising a container 402. The container 402 is adapted to hold a plurality of capsules 5, as represented on FIG. 6. For instance, the container 402 may be a cavity formed in a housing of the capsule storage 400. The container can be filled in with capsules 5 by the user for easily pick-up one of the capsules 5 held by the container when he want to prepare a beverage. The capsule storage 400 comprises a sensing arrangement (not represented) adapted to detect the presence of capsules in a detection area and, optionally, to obtain information related to said capsules. The sensing arrangement is further adapted to count the number of capsules in the detection area. For instance, the sensing arrangement may be adapted to count the number of capsules in the detection area by receiving or reading information from the capsules present in the detection area, for example by receiving signals from RFID tags embedded in each capsule and identifying each one separately, and/or by measuring at least one of the following characteristic of the capsules positioned in the detection area: geometry or optical pattern recognition, weight, identifying information for identifying each capsules separately. In the perspective views of FIG. 6, the detection means, recognition means, and counting means are not visible, hidden by the housings of the capsule storage: The capsule detector and the recognition means may be positioned in the vicinity of the detection area, for instance in or on the wall of the container. The capsule storage comprises a controller (not represented), visual feedback means 404, and an interface 404 for the controller to control visual feedback means. In the embodiment illustrated on FIG. 6, the capsule storage comprises visual feedback means, for example a filling level indicator capable of visually display different level of filling of the container and/or the content of container, for instance a quantity or an information proportional to the quantity of each type of capsules. More particularly, the controller is configured to control, through the interface 404, the feedback means to display information related to the detected capsules on the detection area, such as the number of capsules in the container, and/or the number of capsules of each type. The count and/or type for the detected capsules is/are determined using information provided by the sensing arrangement, such as its spectral property, electrical property, electromagnetic property, emitted or reflected signal, color, resistivity, capacitance, variation of the magnetic field, magnetic induced field, geometry, code bar, identifier, signal, electromagnetic echo, weight, and mechanical parameter. As illustrated on the FIG. 6, the visual feedback means display using lines of light-emitting devices the level of filling of the container (number of illuminated lines depending of the number of capsules of a given type). Moreover, as also illustrated on the FIG. 6, the visual feedback means display, using group of lines of light-emitting devices, the level of filling for each type of capsules by using different colors for each group (a different color for each type of capsules), and using different number of lines for each group (number of illuminated lines depending of the number of detected capsules of a given type).

Referring to FIGS. 7a and 7b, there is shown therein an embodiment of the capsule storage and a beverage preparation machine 200. The capsule storage further comprises a second connector 112 adapted to be coupled into a third external connector 210 of a beverage preparation machine 200. The second connector 200 may be arranged to receive energy supplied by the third external connector 210, and to distribute through power circuit said energy to components of the device. The second connector 112 and the third external connector 210 may be of a USB type for example. In the embodiment of FIG. 7, the capsule storage may further comprise a second communication interface adapted for exchanging data with the beverage preparation machine. In particular, the controller is further configured to send, through the second communication interface, the information related to the detected capsule, to the beverage preparation machine. The controller can also be further configured to send to the feedback means, through the first communication interface, the information received from the beverage preparation machine on the second communication interface. As illustrated on FIGS. 7a and 7b, the beverage preparation machine comprises a communication interface adapted for exchanging data with the capsule storage, and a connector adapted to be coupled into the corresponding connector of the capsule storage for supplying energy to said storage. The communication interface of the beverage preparation machine may share the same connector used to supply energy.

The invention claimed is:

1. A device comprising a container for storing capsules containing an ingredient for preparing a beverage using a beverage preparation machine, the device further comprising:
   a first interface for communicating with feedback means;
   a sensing arrangement adapted to detect the presence of a capsule in a detection area and to obtain information related to said capsule; and
   a controller configured to send, through the first interface, information related to the detected capsule; and
   wherein the sensing arrangement is further adapted to count the number of capsules in the detection area, and wherein the controller is further configured to send, through the first interface, the number of capsules in the detection area, to the feedback means.

2. The device according to claim 1, wherein the sensing arrangement is adapted to obtain information related to the capsule by receiving or reading information from the capsule and/or by measuring at least one of the following characteristics of the capsule: spectral property, colour, electrical property, resistivity, capacitance, electromagnetic property, magnetic induced field, mechanical property, geometry, weight, identifying information, code bar, and emitted or reflected signal.

3. The device according to claim 2, wherein the sensing arrangement is further adapted to identify a type for the capsule, and send, through the first interface, data related to the type for the capsule, the controller being further configured to send, through the first interface, the type of the capsule in the detection area to the feedback means.

4. The device according to claim 1, further comprising a positioner in the detection area, wherein the positioner is arranged to hold at least one capsule.

5. The device according to claim 1, further comprising a feedback arrangement coupled to the first interface and arranged to provide information to the user related to the information received on the first interface.

6. The device according to claim 1, further comprising a visual feedback arrangement coupled to the first interface and arranged to provide information to the user related to the information received on the first interface.

7. The device according to claim 1, wherein the first interface is further adapted to communicate with an external device provided with feedback and/or display means.

8. The device according to claim 7, further comprising a docking station provided with a support for holding an external device.

9. The device according to claim 8, wherein the docking station is provided with connectors for supplying energy to an external device held by the support.

10. The device according to claim 1, further comprising a second connector adapted to be coupled into a third external connector of a beverage preparation machine, the second connector being arranged to receive energy supplied by the third external connector, and to distribute through a power circuit said energy to components of the device.

11. The device according to claim 1, further comprising a communication interface adapted for exchanging data with a beverage preparation machine.

12. The device according to claim 11, wherein the controller is further configured to send, through the communication interface, the information related to the detected capsule to the beverage preparation machine.

13. The device according to claim 11, wherein the controller is further configured to send, through the first interface, the information received from the beverage preparation machine on the communication interface.

14. A system comprising:
   the device according to claim 1; and
   at least one capsule, wherein the capsule is arranged to communicate information to the sensing arrangement to detect its presence in the detection area and/or at least one of the following measureable characteristics of the capsule: spectral property, colour, electrical property, resistivity, capacitance, electromagnetic property, magnetic induced field, mechanical property, geometry, weight, identifying information, code bar, and emitted or reflected signal, said information and/or measurable characteristic(s) being further selected to provide or refer to information related to the detected capsule to the controller through the first interface.

15. A method of using a capsule with the device of claim 4, the method comprising:

arranging the capsule within the device so as to communicate information to the sensing arrangement to detect its presence in the detection area and/or at least one of the following measureable characteristics of the capsule: spectral property, colour, electrical property, resistivity, capacitance, electromagnetic property, magnetic induced field, mechanical property, geometry, weight, identifying information, code bar, and emitted or reflected signal, said information and/or measurable characteristic(s) being further selected to provide or refer to information related to the detected capsule to the controller through the first interface.

16. A beverage preparation machine comprising:

a communication interface adapted for exchanging data with the device according to claim 1; and/or a connector adapted to be coupled into an external connector of the device according to claim 10 for supplying energy to said device.

* * * * *